US006829333B1

(12) United States Patent
Frazier

(10) Patent No.: US 6,829,333 B1
(45) Date of Patent: Dec. 7, 2004

(54) AUTOMATED SYSTEM FOR MESSAGING BASED ON CHAINS OF RELATIONSHIPS

(75) Inventor: Timothy M. Frazier, Livermore, CA (US)

(73) Assignee: Frazier Spaeth LLC, Livermore, CA (US)

(*) Notice: Subject to any disclaimer, the term of this patent is extended or adjusted under 35 U.S.C. 154(b) by 0 days.

(21) Appl. No.: 09/495,403

(22) Filed: Jan. 31, 2000

(51) Int. Cl.[7] ............................................. H04M 1/64
(52) U.S. Cl. .................................... 379/88.17; 707/104.1
(58) Field of Search ........................ 364/403; 235/441; 707/514; 379/83, 88.11, 88.25, 88.17

(56) References Cited

U.S. PATENT DOCUMENTS

| 5,434,775 | A | * | 7/1995 | Sims et al. ..................... 705/8 |
| 5,548,753 | A | | 8/1996 | Linstead et al. |
| 5,555,346 | A | | 9/1996 | Gross et al. |
| 5,790,793 | A | | 8/1998 | Higley |
| 5,999,978 | A | | 12/1999 | Angal et al. |
| 6,154,741 | A | | 11/2000 | Feldman |
| 6,480,810 | B1 | | 11/2002 | Cardella et al. |

OTHER PUBLICATIONS

IBM Corporation, International Technical Support Organization: LotusScript for Visual Basic Programmers, First Edition (Aug. 1996).

Lotus Development Corporation: Lotus MQSeries and CICS Connections for Domino, White Paper.

Katsaros, John, "Mail Plus: The Real Issue in Comparing Lotus Notes/Domino with Microsoft Exchange", Collaborative Research, pp. 1–9, 1999.

More on Release 4.6.

Synergistics Inc. and Lotus Development Corporation, "Why is Notes/Domino a Good Platform for Sales Automation?" An Interview with J. Steven Osbourne, Vice President of Product Management, Synergistics.

* cited by examiner

*Primary Examiner*—Fan Tsang
*Assistant Examiner*—Ming Chow
(74) *Attorney, Agent, or Firm*—Philip H. Albert; Townsend and Townsend and Crew, LLP

(57) ABSTRACT

A computer system for automatically generating and sending messages to individuals, entities, processes, or locations (objects) in response to events when specified conditions are met. The automated messaging system is capable of delivering generated messages via a plurality of message delivery mechanisms (e.g. e-mail, FAX, voice mail, textual page). The automated messaging system provides the ability to link objects in chains of relationships and to use these chains to determine which messages to generate, which objects are the recipient of generated messages, and via which message delivery mechanism generated messages are sent. The automated messaging system is useful in a variety of environments including asset management, electronic-commerce, and Internet-based securities trading, as well as other applications.

14 Claims, 14 Drawing Sheets

Event Database 62

Event Database 72

Relationship Database 74

Message Criteria Database 76

Proto-message Database 80

Recipient Address Database 84

Event Database 62

| Event Type | Basis Object |
|---|---|
| Movement | Computer 123 |
| Movement | Computer 334 |

Object Database 72

| Object Identifier (OID | Object Type |
|---|---|
| Kristen | Person |
| Tim | Person |
| Susan | Person |
| Computer 123 | Asset |
| Computer 334 | Asset |
| Computer 909 | Asset |
| Phone 998 | Asset |
| Finance | Organization |

Relationship Database 74

| Relationship Type | Child Object | Parent Object |
|---|---|---|
| Used-by | Computer 123 | Tim |
| Used-by | Phone 998 | Tim |
| Used-by | Computer 334 | Kristen |
| Used-by | Computer 909 | Susan |
| Employed-by | Tim | Finance |
| Employed-by | Kristen | Finance |
| Supervised-by | Finance | Susan |

Message Criteria Database 76

| Event Type | Message Delivery Mechanism | Object Type | Relationship Type | Recipient Object |
|---|---|---|---|---|
| Movement | e-mail | Asset | Used-by | Tim |
| Movement | e-mail | Asset | Supervised-by | Susan |

Proto-message Database 80

| Message Delivery Mechanism | Basis Event | Basis Object | Recipient Object |
|---|---|---|---|
| e-mail | Movement computer 123 | Computer 123 | Tim |
| e-mail | Movement computer 123 | Computer 123 | Susan |

Proto-message Database 84

| Address | Message Delivery Mechanism | Recipient Object |
|---|---|---|
| tmf@snflwr.com | e-mail | Tim |
| sms@snflwr.com | e-mail | Susan |

*Fig. 10*

AUTOMATED SYSTEM FOR MESSAGING BASED ON CHAINS OF RELATIONSHIPS

FIELD OF THE INVENTION

The present invention relates to a computer system for automatically generating and sending messages to recipients in response to events when specified conditions are met.

BACKGROUND OF THE INVENTION

People working in organizations often need to know and/or track events relevant to their specific duties and responsibilities within their organizations. In addition, people often need or desire to know and/or track events relevant to their personal lives. Therefore, the need to automatically generate and deliver messages in response to events that meet a prescribed set of conditions is well known.

Current methods for automatically generating messages require a simple (i.e., direct) relationship between the event and the recipient of the message. For example, an investor can instruct an online trading system to send a page or an e-mail "when the stock price of XYZ reaches 50". As another example, a mainframe supervisory operator can instruct an automated paging system to page the operator if the mainframe computer goes down. As a further example, a consumer can instruct an electronic-commerce website to send an e-mail notifying her when a sweater in her size is in stock. It is not straightforward, however, for an automated process to generate messages where a complex or indirect relationship exists, such as an instruction to "tell me when the stock price of any company that is owned by a company in which my brother has stock reaches 50", or "page me if a mainframe computer in a building managed by Jones goes down", or "e-mail me when a sweater in one of my children's sizes is in stock".

A more detailed example of the requirement to automatically generate and deliver messages in response to events is the field of asset management. All organizations, large and small, manage the assets they own or control. Some organizations track their assets to calculate the property, plant and equipment figures for their balance sheets. Other organizations, such as hospitals, track the use of their assets in order to allocate costs associated with those assets to a separate entity (e.g., insurance companies, Medicare). Still other organizations, including many government contractors, universities and research laboratories, use assets purchased as part of their contracts with the government and so must track those assets using strict accountability requirements that typically accompany these contracts.

A simple approach to asset management is to have a database of assets. A typical record in an asset database would include a unique asset identifier, such as an asset number, an asset description and a location within the organization where the asset is deployed. The asset database must be kept up to date as assets are acquired, disposed of, or moved from location to location. A centralized approach to asset management entails having a central group of asset managers track the assets and update the asset database for all work groups within the organization. However, this can add considerable overhead to the process of managing assets, since an asset manager would need to be called in and take some action for each acquisition, disposal, or movement of an asset from one location to another. If the organization is large, there may be many asset managers. An individual desiring to move an asset from one end of a building to another might find it difficult to identify the correct asset manager to inform of the move.

Another approach is to decentralize the asset management process so that each work group within the organization is responsible for tracking its own assets and making the appropriate updates to the database. While decentralization does make some administrative processes easier, it can make asset management and reporting more difficult from the perspective of the overall organization. Consequently, decentralization might not be acceptable to some organizations that require strict control over their assets.

This shows the need exists in both centralized and decentralized asset management to automatically generate messages in response to changes (which are events) recorded in an asset database. This is also illustrative of the more general requirement for the automated generation of messages in response to events in any circumstance.

Computer systems that generate e-mail messages in response to the recordation of events in a database exist in the prior art. However, these systems are not capable of generating a message when an indirect relationship exists between the event and the message recipient. These systems are also not typically capable of generating messages for a plurality of delivery mechanisms, i.e., they generate messages for delivery by e-mail only.

As used herein, the term "database" generally refers to collections of data organized into structured forms. Some well-known database forms include hierarchical, or tree, structures, relational data structures, network structures, and graph structures.

The data in a database is typically organized to permit easy retrieval of information. Databases are typically used to provide multiple users with access to information in a variety of formats. A database may be implemented on a variety of computer platforms (e.g., personal computer, minicomputer, mainframe computer) and operating systems (e.g., Windows, Macintosh, VMS, OS/390). In some uses of the term "database", the database includes a database engine. A database engine provides an interface for users or programs to access (e.g., read, write, modify) data in the database. For example, an SQL (Structured Query Language) database system might integrate a database and a database engine so that a user or program need not fully understand the details of the database, but need only be able to formulate SQL statements and present those statements to the database system. A database engine can be implemented in dedicated hardware, be embodied in software executed by a general-purpose computer, or be some combination of those.

As used herein, the term "message" refers to data that forms a communication from one or more sources to one or more recipients. A source or recipient is that which has the capability to generate or receive, respectively, a message, and includes an individual, entity, process or location. The capability to generate or receive messages may be provided through any conventional device or technology including Internet appliances, personal digital assistants, pagers, phones, fax machines and computers.

The term "e-mail" generally refers to a utility for communicating messages over a network between e-mail "boxes" that are each associated with a source and/or recipient. Typically, an e-mail message is a "store-and-forward" message, which allows a recipient to receive a message even if the recipient is not connected to the network when the message is sent. With a store-and-forward system, a message travels from the source to the recipient along a path and where the path is temporarily blocked, as would be the case if the device that connects the recipient to the network is temporarily off-line, the message is held and delivered the next time the intended recipient connects to the network.

The term "FAX" generally refers to a utility for communicating messages that are transmitted in a nonreal-time fashion (such as store-and-forward) where the messages are formatted as telephonically transmittable data that is delivered to a device capable of decoding the data and displaying or storing it in a plurality of formats, such as a printed page, a file on a computer's hard drive or spoken word.

The term "voice mail" generally refers to a utility for communicating messages that are transmitted in a nonreal-time fashion (such as store-and-forward) where the messages are formatted as audio data representing human or computer-generated speech, preferably in a language understandable to the recipient.

The terms "textual page" and "page" generally refers to a utility for communicating messages formatted as a signal that triggers a small electronic device called a pager to emit an audible tone or a vibration which alerts the individual in possession of the pager that a message has arrived. A pager typically provides a mechanism capable of displaying the content of the message to the recipient.

The term "server" generally refers to a combination of computer hardware and software that services one or more processes called clients. Clients need not be aware of how the services provided by a server are implemented.

SUMMARY OF THE INVENTION

One advantage of some embodiments of an automated messaging system according to the present invention is that messages generated in response to events can be sent to recipients (e.g., individuals, entities, processes, locations) based on chains of relationships that links the events to the recipients.

One such automated messaging system includes an event database, an object database, a relationship database, a message criteria database, a proto-message database, and a recipient address database to generate and deliver a message in response to an event to a recipient. The automated messaging system allows the relationship between an event and a recipient to be direct or indirect, that is, the relationship can be a chain of relationships that link the event to the recipient. The automated messaging system can deliver the generated messages by a plurality of message delivery mechanisms (e.g., e-mail, FAX, voice mail, voice-synthesized telephone message, textual page).

One embodiment of an automated messaging system according to the present invention is an automated asset management system. In this embodiment, assets are tracked in an asset database. Users and connected systems interact with the asset database to keep its contents up to date. These interactions, which are viewed as events by the asset database, are compared against a list of message generation criteria. If a match is found, a relationship database, which links objects to each other in a chain of relationships, is used to determine what objects (e.g., people, business units, external organizations) should be sent a message about the asset or assets affected by the event. Any object in a chain may be a recipient. Each recipient can choose one or more message delivery mechanisms (e.g., e-mail, FAX, voice mail, textual page) by which messages to that recipient may be delivered. The automated messaging system sends a message to each recipient via its chosen message delivery mechanism(s), thereby notifying each recipient of the event.

The asset management system receives changes from an acquisition module, a retirement/disposal module, a management module, an inventory review module and/or an accounting module. The acquisition module records the addition of new assets. The retirement/disposal module records the removal of assets. The management module records, inter alia, changes to an asset's location, the accountable individual and the accountable work group. The accounting module records the financial transactions that occur for assets.

Other modules might also handle excess assets, inactive assets, assets controlled by agreements, changes based on the physical inventorying of assets, changes based on routine and non-routine maintenance of assets, changes based on the movement of assets by a shipping or material management system, and outputs to reporting systems and accounting systems.

The asset management system, as well as other embodiments of an automated messaging system according to the present invention, can include one computer or a collection of computers, preferably an arrangement that is connected by a network (e.g., an intranet, the Internet) and is scalable to allow many connections with a plurality of nodes. The network may also include other processing elements or equipment (e.g., a printer, a modem, a FAX machine). More generally, an automated messaging system according to the present invention may be embodied in software, hardware or a combination of software and hardware.

In addition to generating and delivering messages relating to the management of assets, an automated messaging system according to the present invention could be used to handle chains of relationships that deal with employment, contract approvals/execution authority, electronic-commerce, etc. In particular, the data structures of or the algorithms used by one or more of the event database, object database, relationship database, message criteria database, proto-message database, and recipient address database could be utilized in an automated system for messaging based on chains of relationships in a wide variety of applications.

A further understanding of the nature and advantages of the inventions herein may be realized by reference to the remaining portions of the specification and the attached drawings.

BRIEF DESCRIPTION OF THE DRAWINGS

FIG. 10 illustrates a set of tables used in one embodiment of an automated messaging system that might be used by an asset management system.

DESCRIPTION OF THE SPECIFIC EMBODIMENTS

In the figures, like elements are labeled with like numbers and different instances of like elements are labeled with like numbers and different parenthetical numbers or letters.

Figure 1:
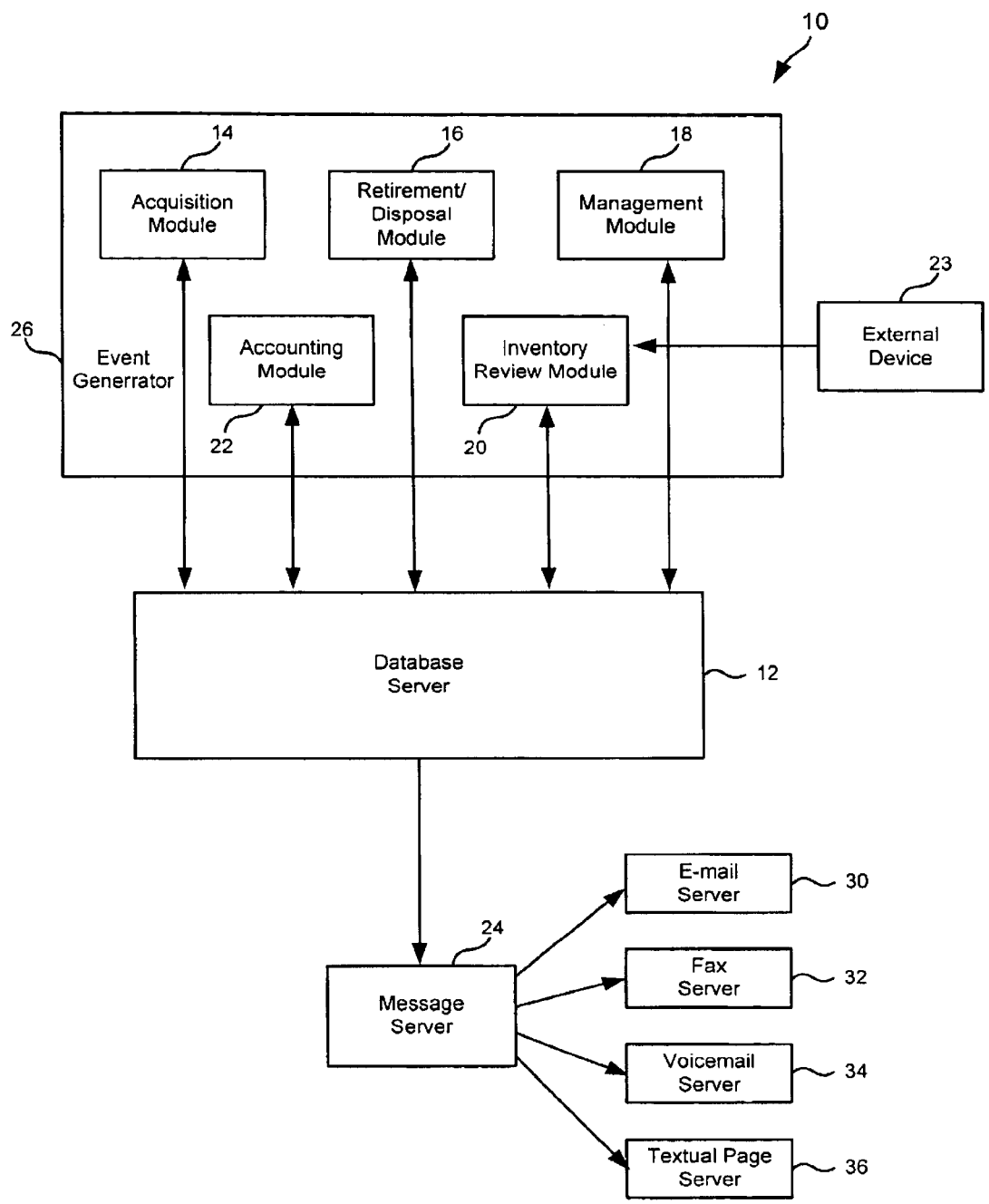
FIG. 1 is a block diagram illustrating one embodiment of an automated messaging system being used by an asset management system according to one embodiment of the present invention.

FIG. 1 illustrates an automated messaging system being used by an asset management system 10 that includes a database server 12 and a variety of connected modules, such as an acquisition module 14, a retirement/disposal module 16, a management module 18, an inventory review module 20, an accounting module 22 and a message server 24. Modules 14, 16, 18, 20 and 22, generically referred to herein as modules, are computer programs residing on a server. As shown, each module is coupled to database server 12 in order to send information to, and/or receive information from, database server 12. As shown in FIG. 1, modules 14, 16, 18, 20, 22 collectively comprise event generator 26. Although five modules are shown, an event generator might have other than five modules. For example, an event generator might comprise just one module.

As shown, message server 24 is coupled to receive message instructions from database server 12 and to send messages to various output servers, such as an e-mail server 30, a FAX server 32, a voice mail server 34 and a textual page server 36, that serve as message delivery mechanisms. E-mail server 30 receives message instructions and generates and delivers an e-mail message to a recipient. FAX server 32 receives message instructions and generates and delivers a FAX to a recipient. Voice mail server 34 receives message instructions and generates and delivers a voice mail message to a recipient. The voice mail server 34 might also handle the sending of synthesized voice messages, which differ from automated voice mail messages only in that the message is played to a person answering the telephone instead of being recorded for later play by the recipient. Textual page server 36 receives message instructions and generates and delivers a textual page to a recipient. The precise technology for generating and delivering e-mails, facsimiles, voice mail messages and textual pages is well known in those various arts. Other message delivery mechanisms known in the art can also be used.

The process used by a delivery mechanism to transmit a message could encode it to accommodate the connections between the source and recipient. For example, if the source and recipient are TCP/IP-aware computers with an internet between them, the message might be encoded as IP packets. If the source and recipient are e-mail enabled computers or applications, the message might be encoded as one or more e-mail messages. If the source and recipient are processes running in an application space under an operating system, the message might be relayed via procedure calls or inter-process messages. Other message transmission processes known in the art can also be used.

The modules in asset management system 10 are preferably designed to assist with the management of assets in each phase of their life, from acquisition through retirement/disposal. Each module interacts, preferably in real-time, with database server 12 to ensure that the data captured by one module is available to any other module as needed. In addition to asset tracking and message instruction generation, database server 12 can be used for other purposes or multiple purposes (such as hosting other software applications, e.g., time keeping, payroll) without duplicating effort.

Each module or event generator sends "events" to database server 12. Acquisition module 14 sends events relating to a new asset to database server 12. The rules that determine how a new asset is categorized do not need to be hard-coded business logic, but can be defined by the user or the organization and stored as business logic. The automated messaging system can generate and deliver a message in response to new asset information being recorded in database server 12.

Asset retirement/disposal module 16 sends events relating to the disposal of an asset from database server 12. Retired/disposed asset information is recorded in database server 12 with complete historical information should it be needed for later analysis.

Management module 18 assigns to each asset a location, an accountable individual and an accountable organization. A history of each update, including who made the change and when, is retained for each asset. Data security is maintained by allowing only those users who have been explicitly given access to an organization's asset data the capability to perform updates on those records. An asset's accountable individual can be given the capability, by the asset's accountable work group, to update the location of his or her assets. The automated messaging system can generate and deliver a message in response to updates to an asset's location, accountable individual and accountable organization (or any other asset property) being recorded in database server 12.

In order to provide for inter-work group and inter-individual transfers, management module 18 uses a request/accept/deny paradigm to ensure that accountability is not transferred without the consent of both parties. This permits a work group or individual to request that a second work group or individual become accountable for an asset. The automated messaging system can generate and deliver a message in response to requests for transfers being recorded in database server 12. If the second party agrees to the transfer, the request is accepted and accountability is transferred without further action on the part of the requesting party. The automated messaging system can generate a message in response to the second party's acceptance of the transfer being recorded in database server 12. If the second party disagrees with the requested transfer, the request is denied and the automated messaging system can generate and deliver a message in response to the second party's denial of the transfer being recorded in database server 12.

Management module 18 might also provide mass update capability, so that, in a single transaction, a work group can update the location or accountable individual of several assets, or a user who represents multiple organizations can transfer assets from one work group to another. Because each such update is viewed as an event from the perspective of database server 12, the automated messaging system can generate and deliver a message for each asset that is the subject of a mass update.

Inventory review module 20 supports both work groupwide and random sampling inventory methods. The rules which govern how an inventory will be conducted, from the criteria that determine the inventory baseline to the set of acceptable verifications, are captured by database server 12 for use in subsequent processing and reporting. Inventory review module 20 can upload data from an external device 23 (e.g., a barcode device, a hand held computer) as a verification. Inventory review module 20 can also recognize changes recorded in database server 12 as a verification, such as the receipt of an asset into excess or the change of an asset's accountable organization. Such changes are known as inventory by exception verifications. Because each such verification is viewed as an event from the perspective of database server 12, the automated messaging system can generate and deliver a message in response to the upload of a verification from an external device 23 or the creation of an inventory by exception in database server 12.

Accounting module 22 performs several functions, some of which can be triggered automatically by other modules. As an example, asset capitalization can be automatically triggered once the acquisition of an asset is complete. Other accounting functions operate independently; for example, an asset's capitalized value can be transferred when one asset is incorporated into another. In either case, accounting module 22 produces journal entries in real-time and posts them to a subsidiary ledger contained within database server 12. Accounting module 22 also calculates and records the depreciation of assets. The frequency and method used to calculate the depreciation is definable by the organization. Because financial transactions and their associated journal entries are viewed as events from the perspective of database server 12, the automated messaging system can generate and deliver a message automatically in response to journal entries being posted to the subsidiary ledger in database server 12 and in response to events being recorded by accounting module 22 in database server 12.

Those skilled in the art will recognize that other input and output modules can be added to or substituted into this system. Those skilled in the art will also recognize that each input and output module specified above may not be necessary to every embodiment of the invention.

Figure 2:
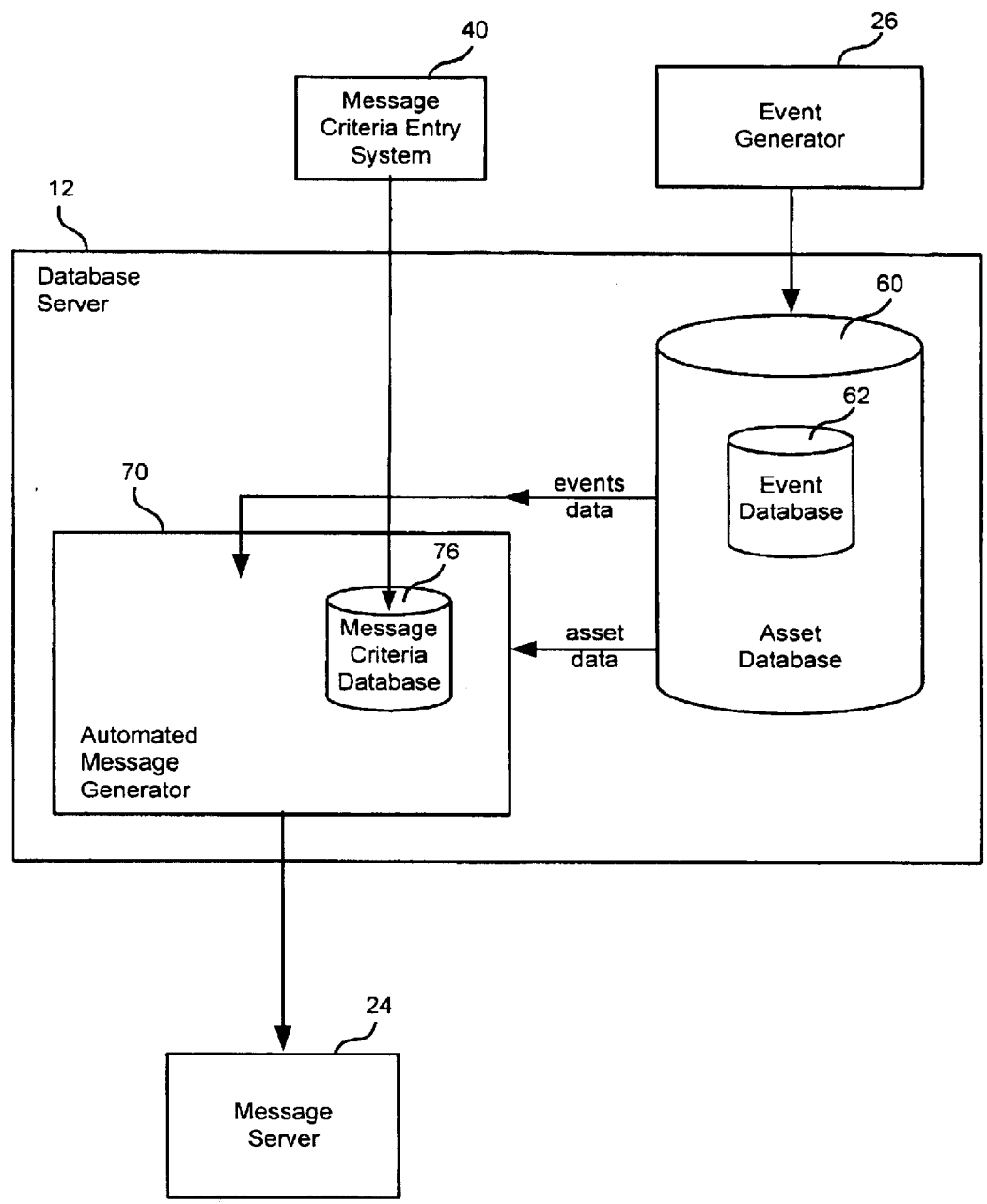
FIG. 2 is a more detailed block diagram of the database server shown in FIG. 1.

FIG. 2 illustrates that database server 12 may include an asset database 60 and an automated message generator 70. Alternatively, asset database 60 can be distinct from automated message generator 70. A portion of asset database 60 can serve as event database 62. Alternatively, event database 62 can be distinct from asset database 60. A portion of automated message generator 70 can serve as a message criteria database 76. Alternatively, message criteria database 76 can be distinct from automated message generator 70.

As shown in FIG. 2, events are generated by event generator 26 (e.g., acquisition module 14, retirement/disposal module 16, management module 18, inventory review module 20, accounting module 22) and are recorded in event database 62.

Message criteria database 76 records the conditions under which recipients should be notified of an event recorded in event database 62. Message criteria entry system 40 is used by recipients to record these conditions (e.g., via an HTML page that displays a list of event types from which recipients can choose). Message criteria database 76 also records the message delivery mechanisms (shown as e-mail server 30, FAX server 32, voice mail server 34 and textual page server 36 in FIG. 1) chosen by recipients for resulting messages.

Automated message generator 70 examines the events captured in event database 62 and the contents of message criteria database 76 to determine what messages are to be generated and delivered to which recipients via which message delivery mechanisms. Automated message generator 70 passes message instructions to message server 24, for delivery to recipients using one or more message delivery mechanisms.

Figure 3:
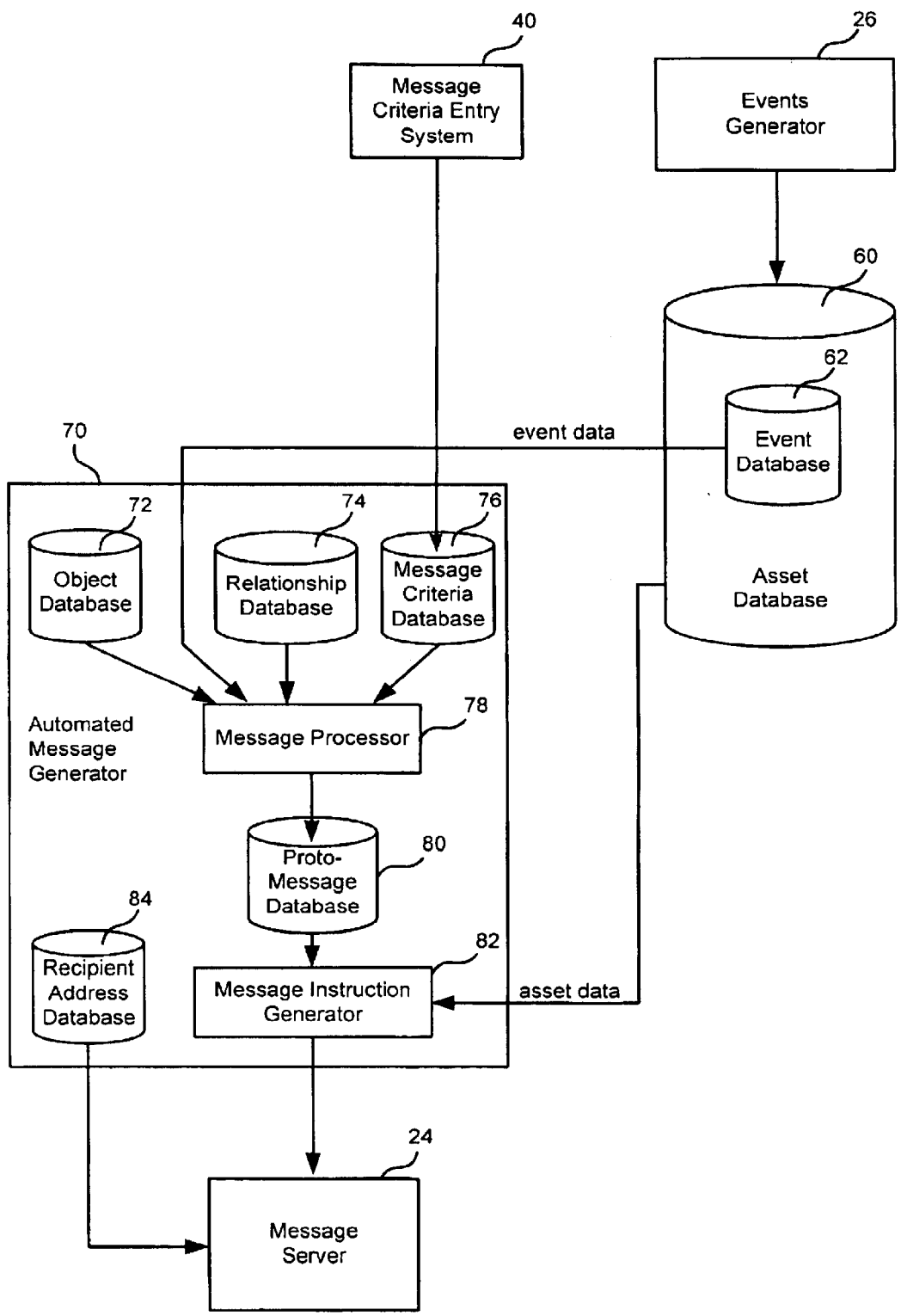
FIG. 3 is a more detailed block diagram of the automated message generator shown in FIG. 2 and its related parts.

FIG. 3 shows a more detailed view of the message generation process by automated message generator 70. Automated message generator 70 is shown comprising an object database 72, a relationship database 74, a message criteria database 76, a message processor 78, a proto-message database 80, a message instruction generator 82, and a recipient address database 84. Message processor 78 interacts with event database 62, object database 72, relationship database 74 and message criteria database 76 to generate proto-messages that are recorded in proto-message database 80. Proto-message database 80 captures the data needed by message instruction generator 82 to generate message instructions for message server 24. One way for message processor 78 to interact with event database 62, is for message processor 78 to poll event database 62 to determine when a new event has been recorded. Another way for message processor 78 to interact with event database 62 is for event database 62 to use an asynchronous mechanism (such as a database trigger) to inform message processor 78 that new events have been recorded. Other ways may also be used.

Message instruction generator 82 receives a proto-message from proto-message database 80 and retrieves asset data from asset database 60 to create a set of message instructions for message server 24. One way for message instruction generator 82 to interact with proto-message database 80 is for message instruction generator 82 to poll proto-message database 80 to determine when a new proto-message has been recorded. Another way for message instruction generator 82 to interact with proto-message database 80 is for proto-message database 80 to use an asynchronous mechanism (such as a database trigger) to inform message instruction generator 82 that a new proto-message has been recorded. Other ways may also be used. Message instruction generator 82 can retrieve asset data from asset database 60 by ways well known in the art, such as SQL statements, to enable message instructions to include pertinent asset information such as asset number and asset description.

Message server 24 retrieves the address of the recipient from recipient address database 84 by ways well known in the art, such as SQL statements.

While the various components of automated message generator 70 are shown in close proximity in FIG. 3, those components could be distributed over a network or other remote computing model, without departing from the scope of the invention.

Figure 4:
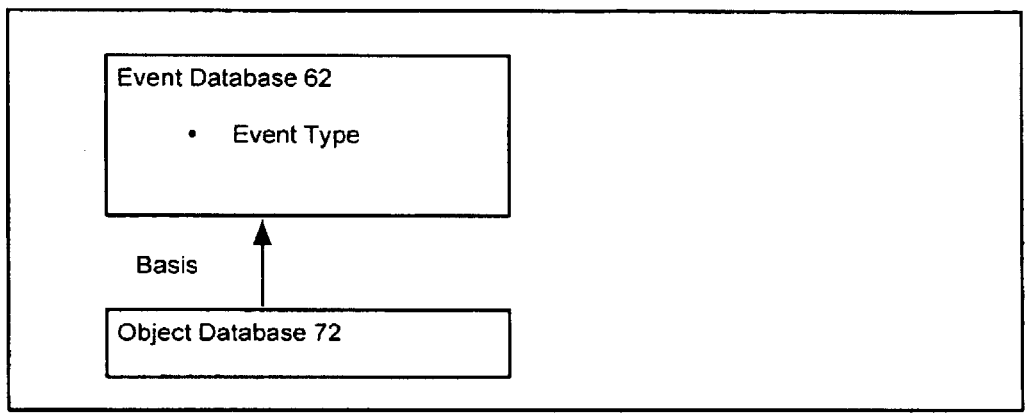
FIG. 4 is a diagram showing the attribute and relationship of event database 62.

FIG. 4 is a diagram of the attribute and relationship of event database 62. An attribute is a constituent element of an instance of a database. An attribute is also sometimes called a field. A relationship associates an instance of a database with an instance of the same or a different database. Event database 62 records the events that trigger the generation of a message. At a minimum, event database 62 preferably includes one attribute:

Event Type—the type of event that has occurred and one relationship:

Basis Object—the object that is the subject of the event. Event database 62 might also include other relationships and other attributes (e.g., the event's date and time) that might be needed for actions other than message generation.

Figure 5:
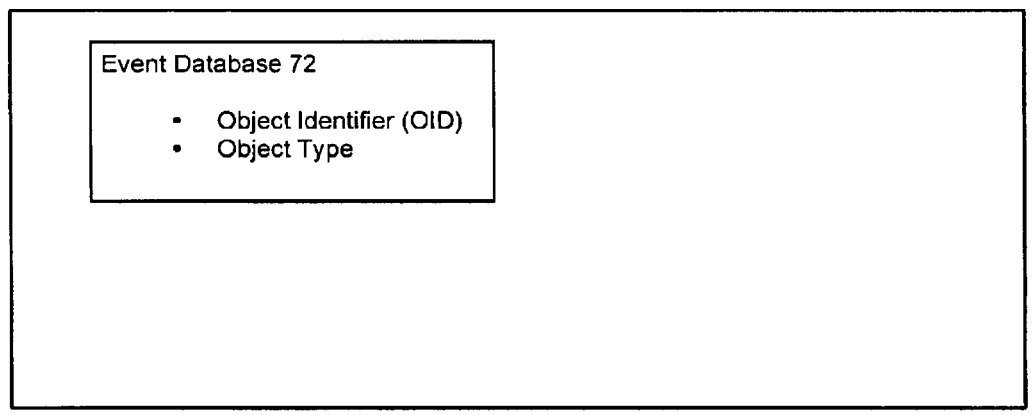
FIG. 5 is a diagram showing the attributes of object database 72.

FIG. 5 is a diagram of the attributes of object database 72. Object database 72 records the objects that are the subjects of the events that may trigger the generation of a message. At a minimum, object database 72 preferably includes two attributes:

Object Identifier (OID)—the object's unique identifier

Object Type—the object's type.

Object database 72 might also include relationships and other attributes (e.g., last name, first name, employee number, asset identifier) that might be needed for actions other than message generation.

Figure 6:
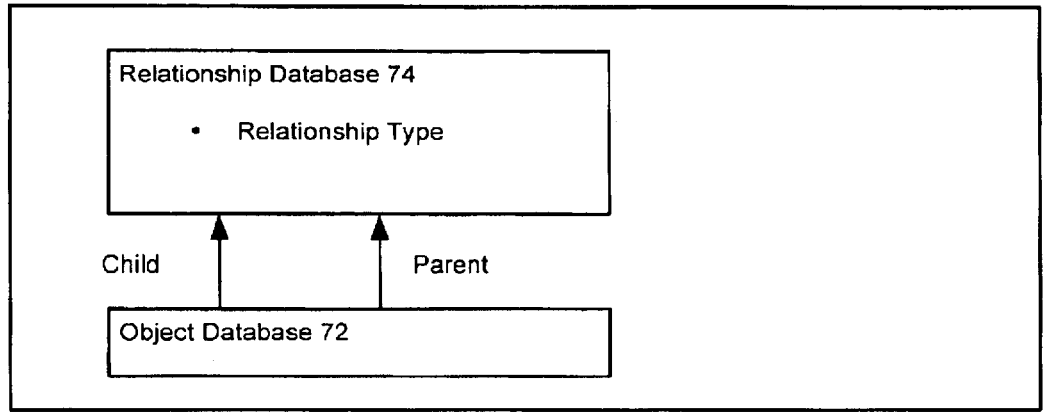
FIG. 6 is a diagram showing the attribute and relationships of relationship database 74.

FIG. 6 is a diagram of the attribute and relationships of relationship database 74. Relationship database 74 records the hierarchical (i.e. parent/child) relationships between objects. Relationship database 74 is capable of representing a hierarchy of arbitrary complexity and arbitrary depth. There is no restriction placed on either the number of parents or children an object can have or the number of ancestors or descendants an object can have. At a minimum, relationship database 74 preferably includes one attribute:

Relationship Type—the type of relationship between the parent and child objects and two relationships:

Child Object—the object that is considered to be the child in the relationship

Parent Object—the object that is considered to be the parent in the relationship.

Relationship database 74 might also include other relationships and other attributes (e.g., creation date and time, modification date and time, backup message delivery mechanism) that might be needed for actions other than message generation.

Figure 7:
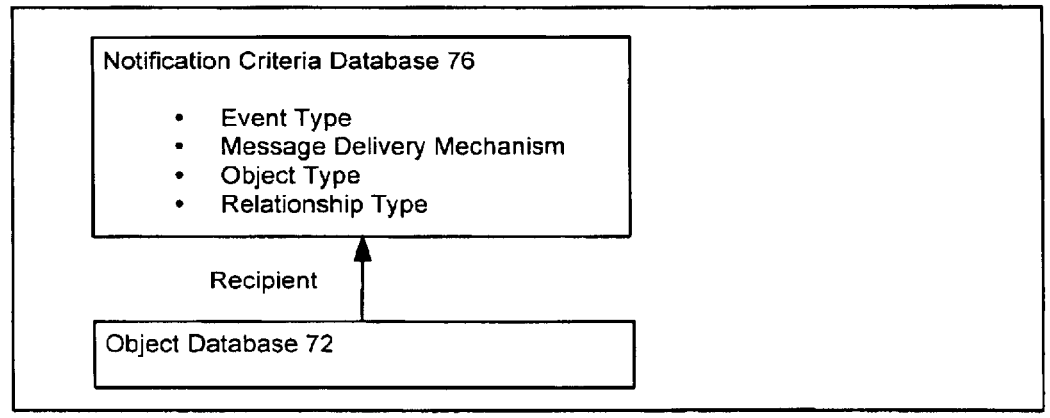
FIG. 7 is a diagram showing the attributes and relationship of message criteria database 76.

FIG. 7 is a diagram of the attributes and relationship of message criteria database 76. Message criteria database 76 records the criteria that determine the conditions under which a message is generated. At a minimum, message criteria database 76 preferably includes four attributes:

Event Type—the type of event that triggers the generation of a message

Message Delivery Mechanism—the mechanism that delivers a generated message

Object Type—the type of object that triggers the generation of a message

Relationship Type—the type of relationship (direct or indirect) between an object and a recipient that triggers the generation of a message and one relationship:

Recipient Object—the object that is to receive a generated message.

Message criteria database 76 might also include other relationships and other attributes (e.g., criterion creation date and time, modification date and time, backup message delivery mechanism) that might be needed for actions other than message generation.

Figure 8:
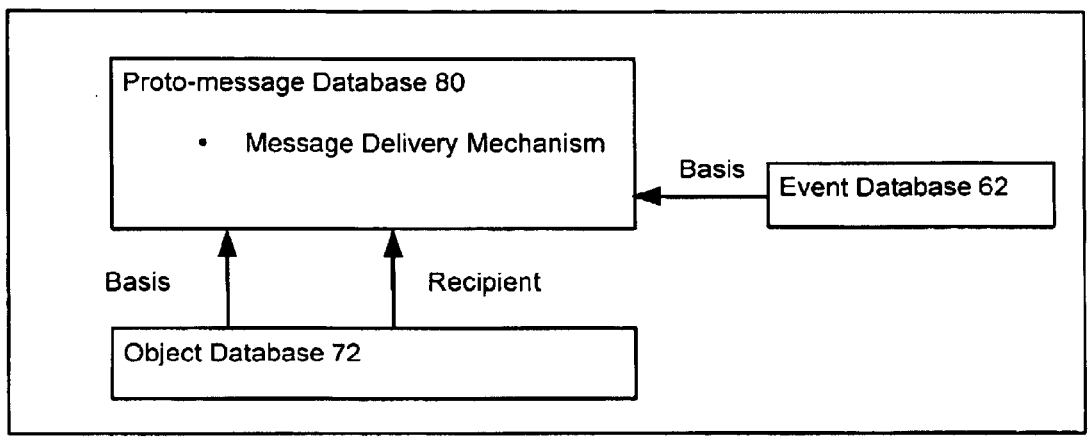
FIG. 8 is a diagram showing the attribute and relationships of proto-message database 80.

FIG. 8 shows a diagram of the attribute and relationships of proto-message database 80. Proto-message database 80 records the events and objects that the automated messaging system has determined will result in the generation of a message. Proto-message database 80 includes enough information to allow message instruction generator 82 to produce a message capable of being delivered by message server 24. Proto-message database 80 preferably includes at least one attribute:

Message Delivery Mechanism—the mechanism that delivers a generated message and three relationships:

Basis Event—the event that has triggered the generation of a message

Basis Object—the object that is the subject of the event that has triggered the generation of a message Recipient Object—the object that is to receive the generated message.

Proto-message database 80 might also include other relationships and other attributes (e.g., creation date and time, modification date and time, backup message delivery mechanism, message number) that might be needed for actions other than message generation.

Figure 9:
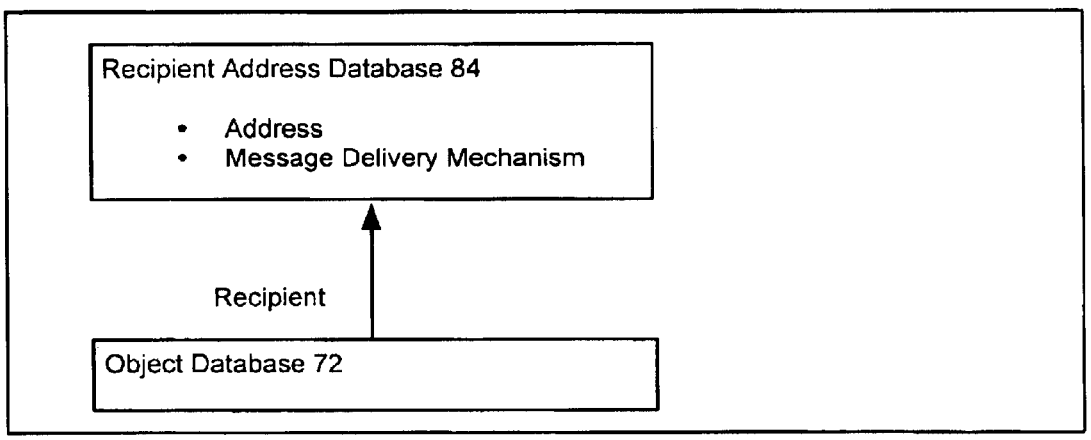
FIG. 9 is a diagram showing the attributes and relationship of recipient address database 84.

FIG. 9 is a diagram of the attributes and relationship of recipient address database 84. Recipient address database 84 records the message delivery mechanism-specific addresses for recipients. Because each message delivery mechanism formats addresses differently (e.g., a FAX machine uses a 10-digit numeric phone number and an e-mail server uses an alphanumeric string typically delimited by some combination of punctuation characters), recipient address database 84 is flexible in its storage of message delivery mechanism addresses. A method for storing data of varied formats that is well known in the art is to use a large (typically greater than 1000 positions) alphanumeric attribute to capture the data; other methods can also be used. This will permit recipient address database 84 to capture addresses that are strictly numeric (e.g., phone numbers) and addresses that may contain a combination of numeric, alphanumeric and possibly other characters (e.g., e-mail addresses).

Alternate structures and storage mechanisms for recipient address database 84 are possible and, in fact, likely to be seen in practice. For example, it is common for commercial human resource software applications (e.g., Peoplesoft, Oracle, SAP) to record the phone numbers (e.g., voice, FAX, pager, mobile) and e-mail addresses for employees. Internet standard directory protocols (e.g., LDAP, ph) are also used to capture phone numbers, e-mail addresses and network addresses for both people and other inanimate objects (e.g., conference rooms, FAX machines, printers). The automated messaging system can make use of these and other alternate recipient address databases without substantial modification. At a minimum, recipient address database 84 preferably includes two attributes:

Address—the recipient's address

Message Delivery Mechanism—the mechanism that delivers a generated message and one relationship:

Recipient Object—the object whose address is represented.

Recipient address database 84 might also include other relationships and other attributes (e.g., creation date and time, modification date and time, address type) that might be needed for actions other than message generation.

While the various databases are separately shown in FIGS. 4–9, those databases could be on a single server or could be distributed over a network (e.g., Internet, intranet, etc.) or other computing model. Like messages, the data structures disposed in these databases may be contained in a computer data signal embodied in a computer usable (e.g. readable) transmission medium (e.g., carrier wave or any other such medium, including digital, optical or analogbased medium) thereby facilitating (for example) such network communication. Additionally, as would be understood by those having ordinary skill in the art, the databases of FIGS. 4–9 may be disposed in any computer usable (e.g., readable) medium, including semiconductor memory, magnetic disk and optical disc.

FIG. 10 illustrates, in tabular form with hypothetical data, the structure of the databases shown in FIGS. 4–9. While the sample data given in FIG. 10 and the discussion below show a recipient as a person, message criteria database 76, proto-message database 80, and recipient address database 84 can also accommodate nonperson recipients, thereby allowing a message recipient to be, for example, a shared FAX machine, computer console, or cable set top box.

Figure 11:
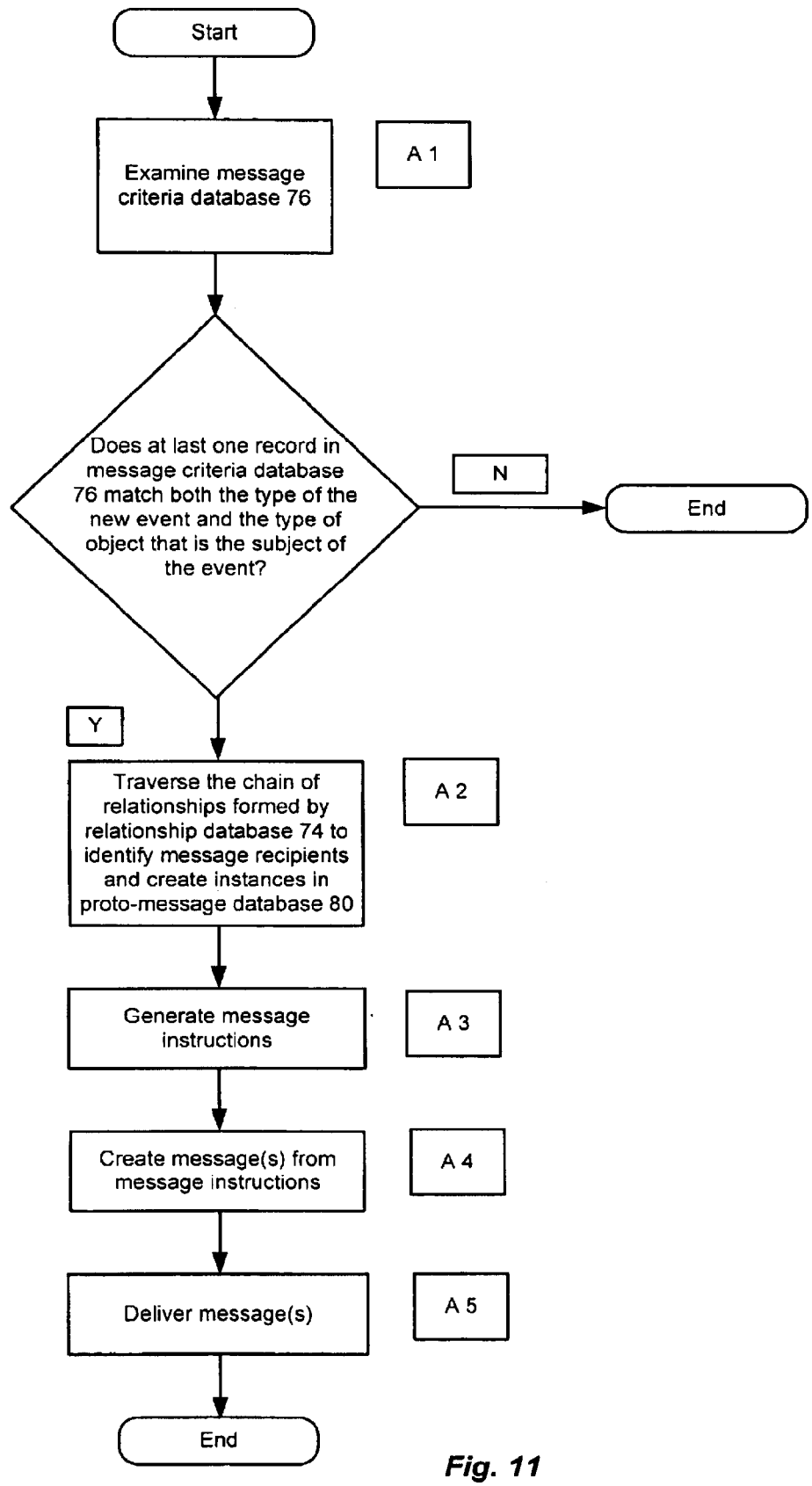
FIG. 11 is a flow chart showing the overall message generation and delivery process.

FIG. 11 is a flow chart which shows a process that can be used by message processor 78 to determine which events recorded in event database 62 should trigger the generation of a message. The steps of the process are labeled "A1", "A2", "A3", "A4" and "A5" are referenced below.

Step A1:

Database server 12 can process and record simultaneous events. In a large organization, thousands of events might occur each hour that are processed and recorded by database server 12. Message criteria database 76 and object database 72 will also typically have a large number of records. Because of the size of these databases, several efficiency measures might be implemented if the response times are not otherwise reasonable given the computing power available. One measure for message processor 78 to determine if further processing is necessary is to perform a simple test as it considers each newly recorded event in event database 62. That is, message processor 78 tests for the existence of at least one record in message criteria database 76 that matches the event type of the newly created event in event database 62 and the object type of the object that is the subject of the event. If the event type and object type of the newly created event match at least one record in message criteria database 76, processing continues by message processor 78 for the newly created event. Otherwise, the event is considered no further by message processor 78.

Figure 12:
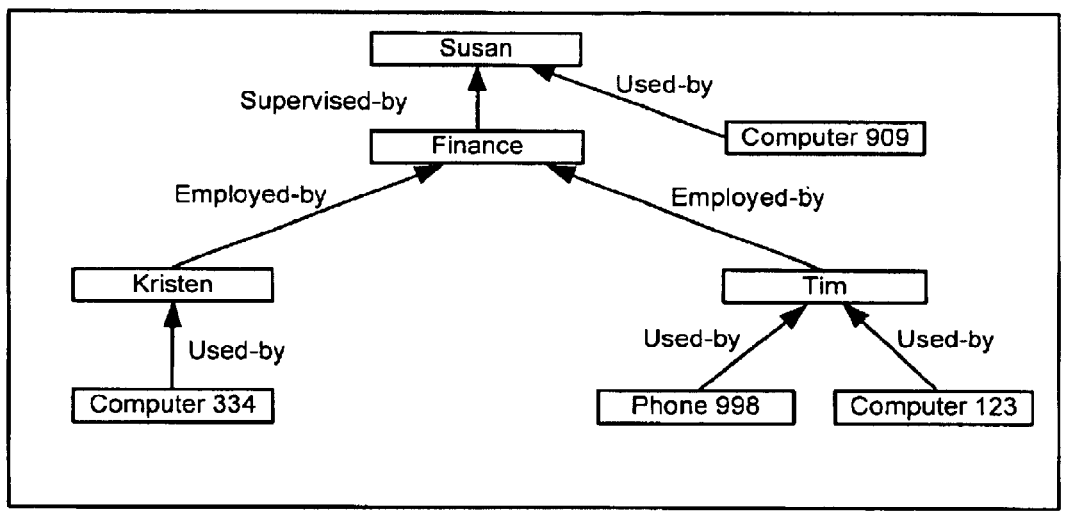
FIG. 12 is a directed graph representation of some of the data shown in FIG. 10.

Step A2:

The chains of relationships between objects are readily visualized when relationship database 74 is drawn as a directed graph, such as in FIG. 12. FIG. 12 illustrates relationship database 74 as a directed graph, wherein the vertices of the directed graph are the parent and child objects and each edge of the directed graph originates at a child object and terminates at a corresponding parent object. Each edge of the directed graph is labeled by the value in the relationship type attribute of relationship database 74. These chains of relationships are used to determine which messages, if any, should be sent when an event is recorded in event database 62.

FIG. 12 is also helpful in understanding the process used to identify message recipients and to generate proto-messages. The process entails traversing the directed graph representation of relationship database 74. Through its child-parent relationships, relationship database 74 creates a tree-structure hierarchy that may be embodied in any conventional manner, such as linked lists or arrays. The message processor 78 begins the traversal at the vertex that corresponds to the object that is the subject of the newly created event. The traversal proceeds along each edge that leads away from the beginning vertex and continues along each edge that leads away from each vertex visited during subsequent steps. Because the directed graph is rooted at a single vertex (i.e. the object that is the subject of the newly created event), the message processor 78 can visit all of the vertices in the directed graph using methods well known in the art, such as a recursive depth-first traversal of the directed graph. See, for example, Sedgewick, R., *Algorithms*, pp. 472–475 (1988). Another possible implementation of the traversal process involves a well-known recursive breadth-first traversal of a directed graph. Other possible implementations of the traversal process, such as those that use an iterative depth-first traversal or breadth-first traversal of a directed graph, can also be used.

Table 1 is pseudocode for a recursive depth-first traversal that may be used by message processor 78 for generating messages in response to events recorded in event database 62. The well-known recursive depth-first traversal has been augmented to determine which messages, if any, are to be generated and delivered to a recipient. The steps of the process are labeled "S1", "S2", "S3", "S4" in the pseudocode and are referenced below parenthetically. The process identifies recipients by traversing paths in the directed graph constructed from relationship database 74 that originate with the object that is the subject of the newly created event by the call Traverse (V, { }) where V is the object that is the subject of the newly created event.

TABLE 1

```
PROCEDURE Traverse (vertex,
{relationship_types_seen_during_traversal})
IS
BEGIN
(S1)    FOR each edge, E, leading away from vertex
        LOOP
(S2)        Traverse (vertex at the termination of the edge, E,
                {relationship_types_seen_during_traversal} +
                E.relationship type);
(S3)        IF there exists an instance, C, in message criteria database 76
                such that:
                    a)  C.event type matches the event
                        type of the newly created event
                    b)  C.object type matches the object
                        type of the object that is
                        the subject of the newly created event
                    c)  C.relationship type is a member of
                        {relationship_types_seen_during_traversal}
                AND
                    there does not exist an instance, P, in proto-message
                    database 80
                    such that:
                    a)  P.event matches the newly created event
                    b)  P.object matches object that
                        is subject of newly created event
                    c)  P.recipient matches C.recipient
                    d)  P.message delivery mechanism
                        matches to C.message delivery mechanism
                THEN
(S4)            create a new instance, M, in proto-message database 80
                such that:
                    a)  M.event = the newly created event
                    b)  M.object = the object
                        that is subject of newly created event
                    c)  M.recipient = the object
                        that corresponds to the vertex,
                    d)  M.message delivery mechanism =
                        C.message delivery mechanism
            END IF;
        END LOOP;
END;
```

Figure 13:
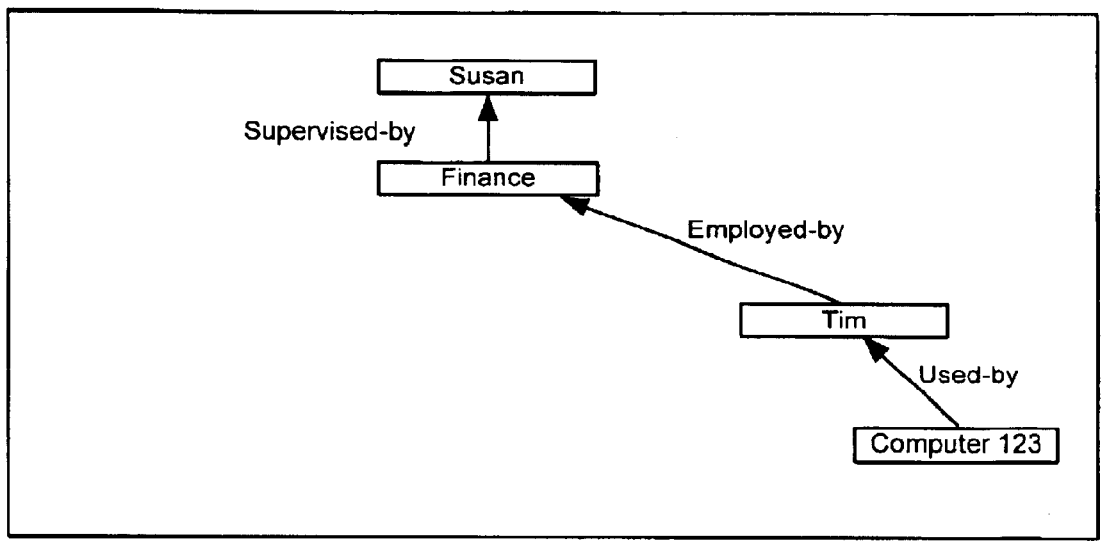
FIG. 13 is a subset of the directed graph of FIG. 12 showing one traversal of the directed graph.

FIG. 13 shows one example of a traversal for the movement of the object "Computer 123". The order in which the vertices are visited and the value of {relationship_types_seen_during_traversal} at each step are shown in Table 2.

TABLE 2

| Visitation | Vertex | {relationship_types_seen_during_traversal} |
|---|---|---|
| 0 | Computer 123 | { } |
| 1 | Tim | {used-by} |
| 2 | Finance | {used-by, employed-by} |
| 3 | Susan | {used-by, employed-by, supervised-by} |

In Visitation 1, message processor 78 visits the "Tim" vertex, and {relationship_types_seen_during_traversal}= {used-by}. All of the conditions of S3 are fulfilled by record 1 of the sample data given for message criteria database 76 in FIG. 10. This results in the creation of a new instance in proto-message database 80 in step S4; that new instance is shown below in Table 3.

TABLE 3

| Message Delivery Mechanism | Basis Event | Basis Object | Recipient Object |
|---|---|---|---|
| e-mail | Movement / computer 123 | Computer 123 | Tim |

In Visitation 2, message processor 78 visits the "Finance" vertex and {relationship_types seen_during_traversal}= {user-by, employed-by}, the conditions of S3 are not fulfilled and no proto-message is generated.

In the Visitation 3, message processor 78 visits the "Susan" vertex, and {relationship_types_seen_during_ traversal}={used-by, employed-by, supervised-by}. All of the conditions of S3 are fulfilled by record 2 of the sample data given for message criteria database 76 in FIG. 10. This results in the creation of a new instance in proto-message database 80 in S4; that new instance is shown in Table 4.

TABLE 4

| Message Delivery Mechanism | Basis Event | Basis Object | Recipient Object |
|---|---|---|---|
| e-mail | Movement / computer 123 | Computer 123 | Susan |

Thus, one newly created event has resulted in two proto-messages for two distinct recipients based on two distinct relationships, the first direct and the second indirect, to the object that is the subject of the newly created event, namely "Computer 123".

Figure 14:
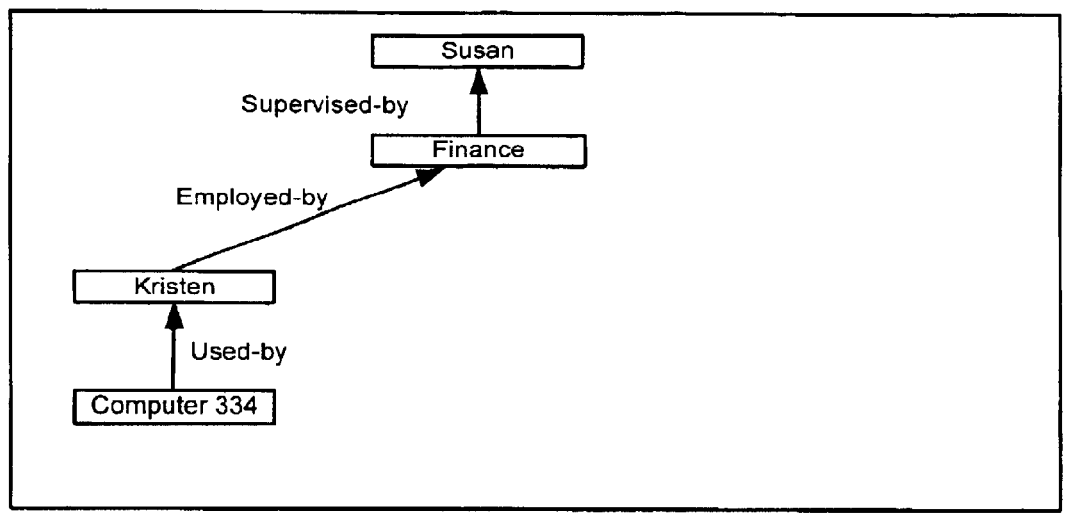
FIG. 14 is a subset of the directed graph of FIG. 12 showing another traversal of the directed graph.

FIG. 14 shows one example of a traversal for the movement of another object, "Computer 334". The order in which the vertices are visited and the value of {relationship_ types_seen_during_traversal} at each step are shown in Table 5.

TABLE 5

| Visitation | Vertex | {relationship_types_seen_during_traversal} |
|---|---|---|
| 0 | Computer 334 | { } |
| 1 | Kristen | {used-by} |
| 2 | Finance | {used-by, employed-by} |
| 3 | Susan | {used-by, employed-by, supervised-by} |

In Visitation 1, message processor 78 visits the "Kristen" vertex and {relationship_types_seen_during_traversal}= {used-by}. All of the conditions of S3 are fulfilled by record 1 of the hypothetical data given for message criteria database 76 in FIG. 10. This results in the creation of a new instance in proto-message database 80 in step S4; that new instance is shown as the first row in Table 6.

In Visitation 2, message processor 78 visits the "Finance" vertex and {relationship types seen_during traversal}= {used_by, employed by}; the conditions of S3 are not fulfilled and no proto-message is generated.

In Visitation 3, message processor 78 visits the "Susan" vertex, and {relationship types seen_during traversal}= {used-by, employed-by, supervised-by}. All of the conditions of S3 are fulfilled by record 2 of the sample data given for message criteria database 76 in FIG. 10. This results in the creation of a new instance in proto-message database 80 in S4; that new instance is shown below as the second row in Table 6.

TABLE 6

| Message Delivery Mechanism | Basis Event | Basis Object | Recipient Object |
|---|---|---|---|
| e-mail | Movement / computer 334 | Computer 334 | Tim |
| e-mail | Movement / computer 334 | Computer 334 | Susan |

Step A3:

Message instruction generator 82 examines, using ways well known in the art, proto-message database 80 and, if needed, asset database 62 and generates message instructions for message server 24.

Step A4:

Based on these message instructions, message server 24 creates one or more messages.

Step A5:

The messages are delivered by one or more of message delivery mechanisms 30–36. In some embodiments, steps A1, A2, A3, A4 and A5 are separate and distinct steps, while in other embodiments, two or more of the steps are combined into one or more combined steps.

Figure 15:
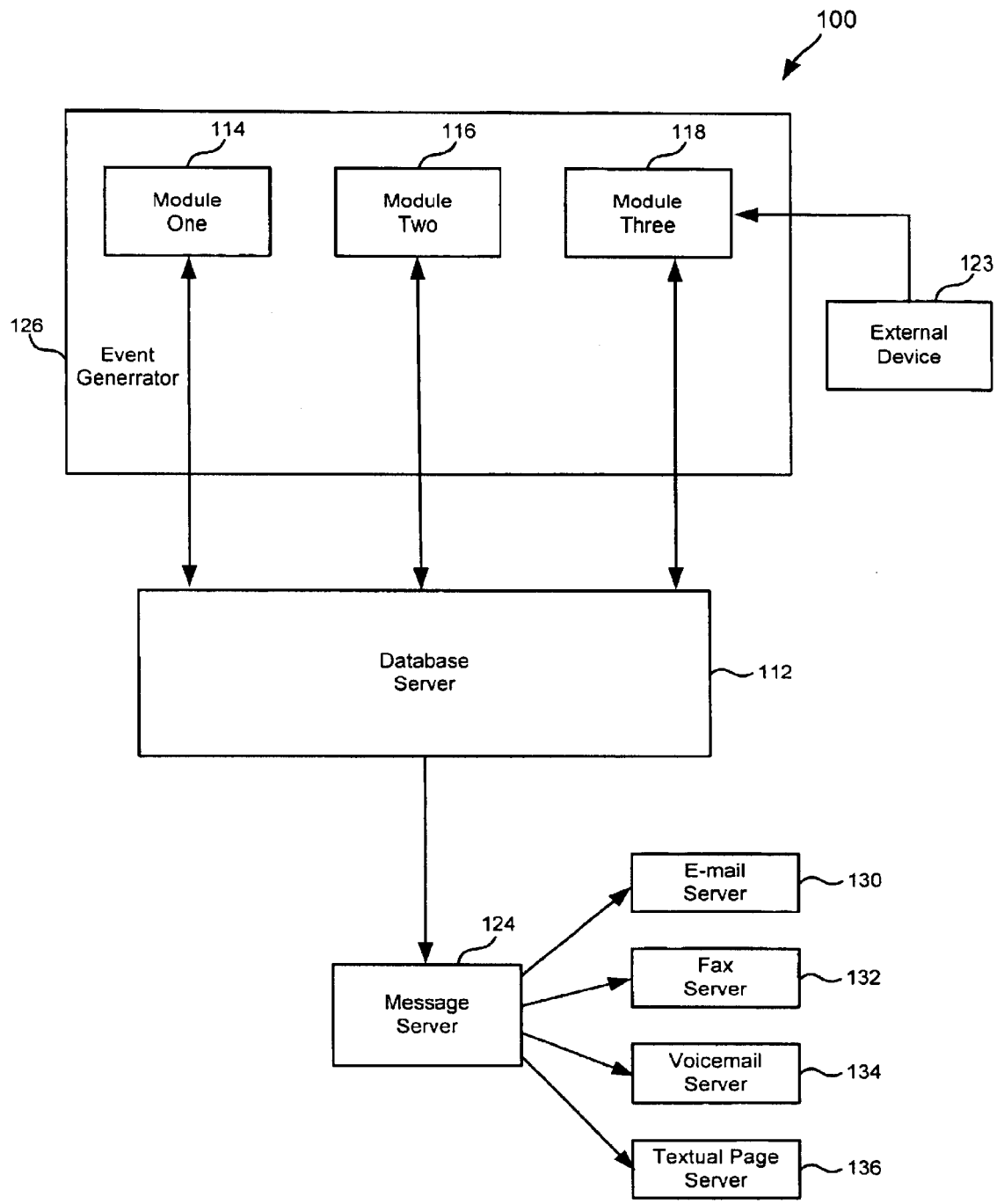
FIG. 15 is a block diagram illustrating the main features of a generic automated messaging system according to one embodiment of the present invention.

A message system for asset management has been described above, with reference to FIGS. 1–14. FIG. 15, et seq., illustrate a generic automated messaging system. Although a particular automated messaging system and a few variations appear in FIGS. 1–14, those skilled in the art will recognize that any of a number of variations could be used to implement the methods of the various embodiments of the present invention. For example, the automated messaging system of FIG. 1 could be implemented as a distributed system for robustness and disaster recovery.

Figure 16:
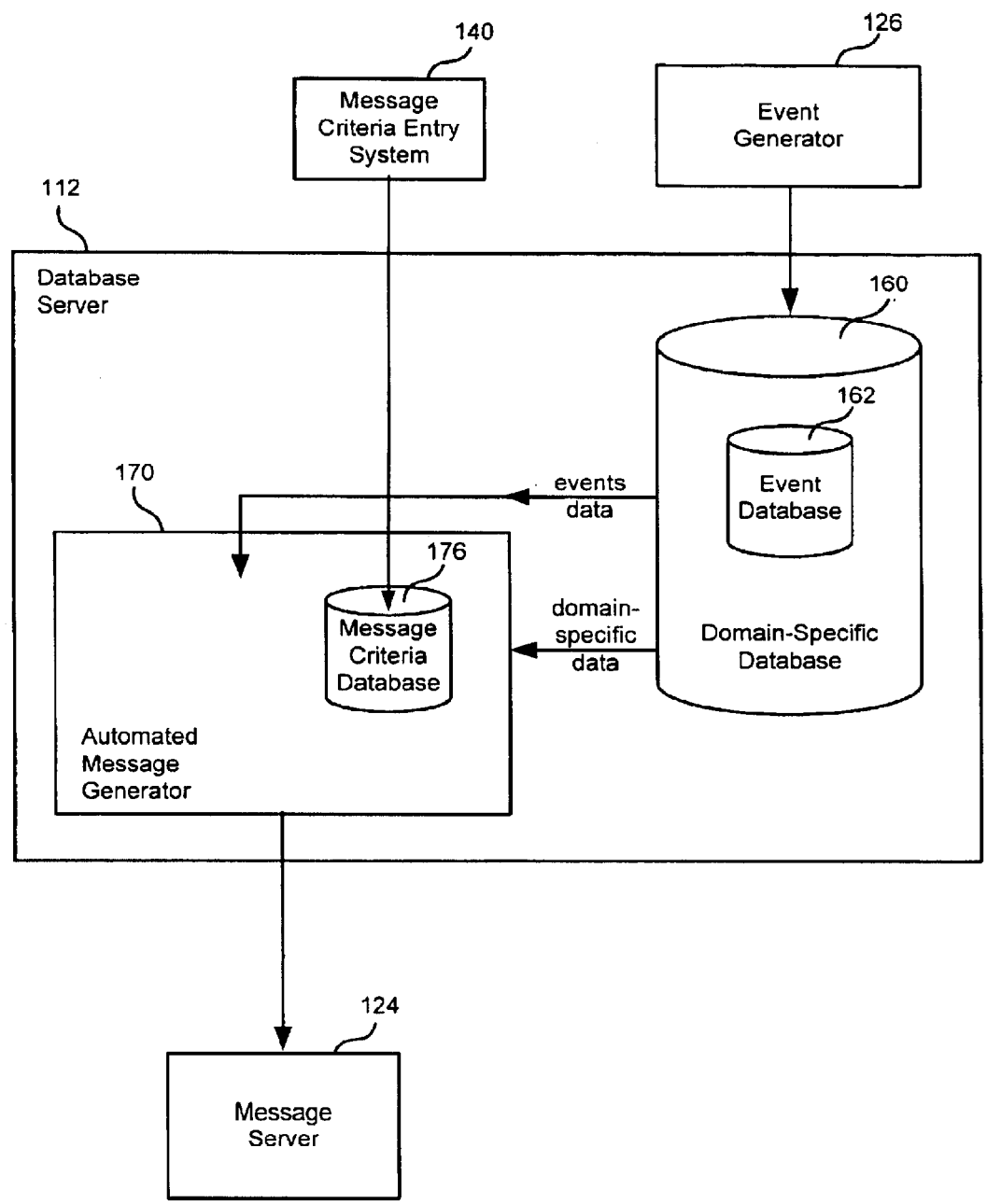
FIG. 16 is a block diagram showing the database server of FIG. 15 in greater detail.
Figure 17:
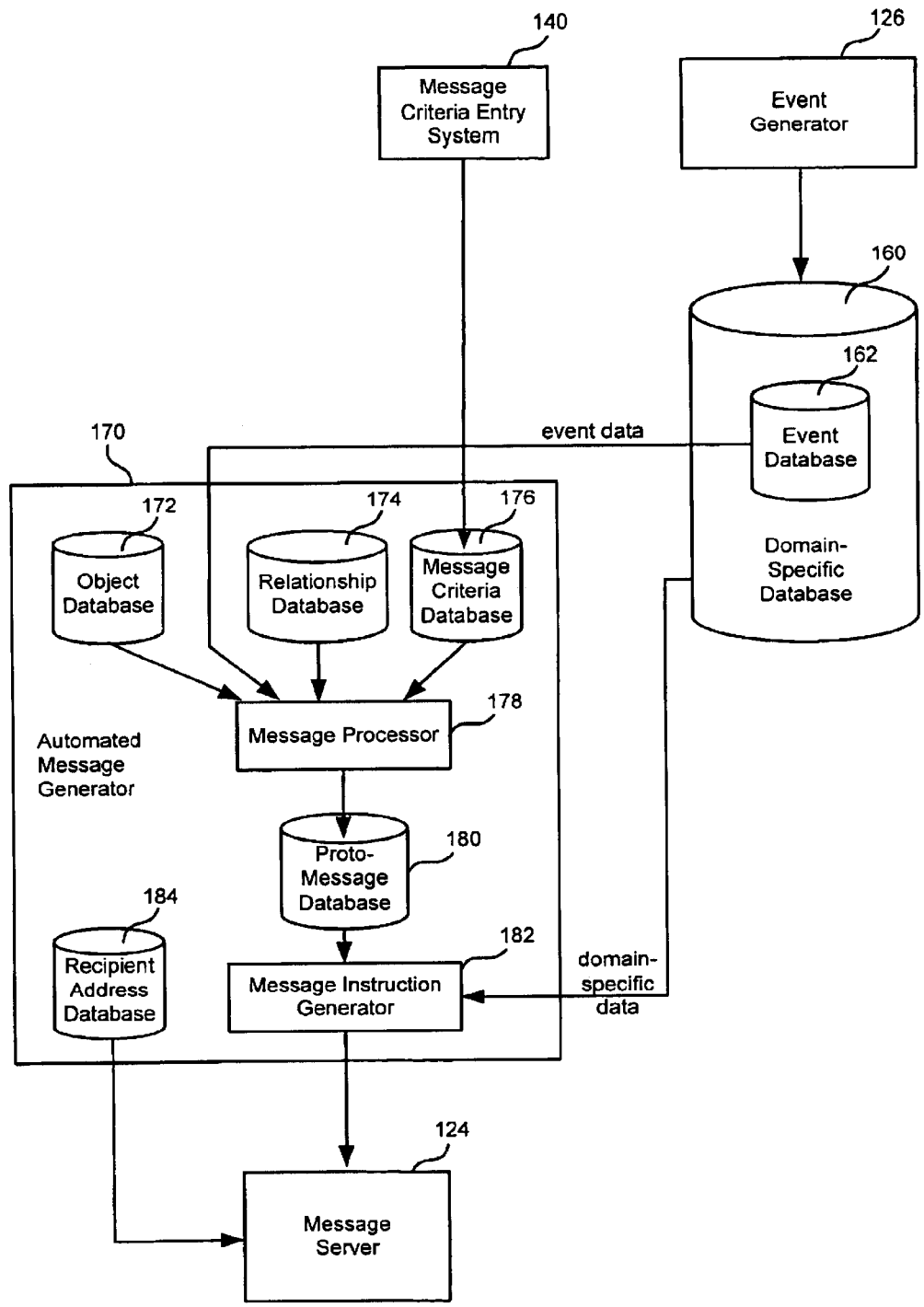
FIG. 17 is a block diagram showing the automated message generator of FIG. 16 and its related parts in greater detail.

As shown in FIGS. 15–17, embodiments of the present invention could be applied to fields other than asset management.

FIG. 15 is a block diagram of an automated messaging system 100, that includes a database server 112 and a variety of connected modules, module one 114, module two 116, and module three 118. Modules 114, 116, 118, are generically referred to as modules. As shown, each module is coupled to database server 112 in order to send information to, and/or receive information from, database server 112. As shown in FIG. 15, modules 114, 116, 118 collectively comprise event generator 126. Although three modules are shown, an event generator might have other than three modules. For example, an event generator might comprise just one module.

As shown, message server 124 is coupled to receive message instructions from database server 112 and to send messages to various output servers, such as an e-mail server 130, a FAX server 132, a voice mail server 134 and a textual page server 136, that serve as message delivery mechanisms. These output servers provide the same functions as the output servers described above with reference to FIG. 1. Again, the precise technology for generating and delivering e-mails, facsimiles, voice mail messages and textual pages is well known in the art. Other message delivery mechanisms known in the art can also be used. Likewise, the processes used by a delivery mechanism to transmit messages are well known in the art as described above.

Automated messaging system 100 is, in many ways, similar to asset management system 10 shown in FIG. 1, except that message system 100 is not limited to events that relate to assets. The modules in automated messaging system 100 are preferably designed to assist with the management or information processing of the domain-specific subject information, such as electronic-commerce or Internet-based securities trading. The modules and servers of automated messaging system 100 interact and are interrelated as are their counterparts shown in and described in reference to FIG. 1, above.

New information or data, updates to information or data (including mass updates), security for information or data, transfer of responsibility for information or data, inventory of information or data, verifications relating to information or data, the interaction of modules, the interaction between one or more modules and one or more external devices (such as described in reference to FIG. 1, above), and the generation and delivery of messages can be accomplished in the same manner or in a similar way as that described in reference to FIG. 1, above.

Those skilled in the art will recognize that other input and output modules can be added to or substituted into this system. Those skilled in the art will also recognize that the number of input and output modules need not be the same in every embodiment.

FIG. 16 illustrates that database server 112 may include a domain-specific database 160 and an automated message generator 170. Alternatively, domain-specific database 160 can be distinct from automated message generator 170. A portion of domain-specific database 160 can serve as event database 162. Alternatively, event database 162 can be distinct from domain-specific database 160. A portion of automated message generator 170 can serve as a message criteria database 176. Alternatively, message criteria database 176 can be distinct from automated message generator 170.

As shown in FIG. 16, events are generated by event generator 1261 (e.g., module one 114, module two 116, module three 118) and are recorded in event database 162.

Message criteria database 176 records the conditions under which recipients should be notified of an event recorded in event database 162. Message criteria entry system 140 is used by recipients to record these conditions (e.g., via an HTML page that displays a list of event types from which recipients can choose). Message criteria database 176 also records the message delivery mechanisms (shown as e-mail server 130, FAX server 132, voice mail server 134 and textual page server 136 in FIG. 15) chosen by recipients for resulting messages.

Automated message generator 170 examines the events captured in event database 162 and the contents of message criteria database 176 to determine what messages are to be generated and delivered to which recipients via which message delivery mechanisms. Automated message generator 170 passes message instructions to message server 124, for delivery to recipients using one or more message delivery mechanisms.

FIG. 17 shows a more detailed view of the message generation process by automated message generator 170. Automated message generator 170 is shown comprising an object database 172, a relationship database 174, a message criteria database 176, a message processor 178, a proto-message database 180, a message instruction generator 182, and a recipient address database 184. Message processor 178 interacts with event database 162, object database 172, relationship database 174 and message criteria database 176 to generate proto-messages that are recorded in proto-message database 180. One way for message processor 178 to interact with event database 162, is for message processor 178 to poll event database 162 to determine when a new event has been recorded. Another way for message processor 178 to interact with event database 162 is for event database 162 to use an asynchronous mechanism (such as a database trigger) to inform message processor 178 that new events have been recorded. Other ways may also be used.

Message instruction generator 182 receives a proto-message from proto-message database 180 and retrieves information or data from domain-specific database 160 to create a set of message instructions for message server 124. One way for message instruction generator 182 to interact with proto-message database 180 is for message instruction generator 182 to poll proto-message database 180 to determine when a new proto-message has been recorded. Another way for message instruction generator 182 to interact with proto-message database 180 is for proto-message database 180 to use an asynchronous mechanism (such as a database trigger) to inform message instruction generator 182 that a new proto-message has been recorded. Other ways may also be used. Message instruction generator 182 can retrieve domain-specific information or data from domain-specific database 160 by ways well known in the art, such as SQL statements, to enable message instructions to include pertinent and/or identifying information or data.

Message server 124 retrieves the address of the recipient from recipient address database 184 by ways well known in the art, such as SQL statements.

While the various components of automated message generator 170 are shown in close proximity in FIG. 17, those components could be distributed over a network or other remote computing model.

The flow chart presented in FIG. 11 and the algorithm presented in Table 1 show a process and algorithm that could be used by message processor 178 to determine which event recorded in event database 162 should trigger the generation of a message, regardless of the field in which message processor 178 is used.

While the above is a complete description of specific embodiments of the invention, additional embodiments are also possible. For example, automated message generator 170 could be configured to generate a signal that performs an action (such as opening a door or changing the state of a switch) rather than generating a message. Therefore, the above description should not be taken as limiting the scope of the invention, which is defined by the appended claims along with their full scope of equivalents.

What is claimed is:

1. A method in a messaging system of generating messages for delivery to recipients in response to events when specified conditions are met, comprising:

recording a plurality of message objects;

recording a plurality of message recipients;

accepting message registrations into a message criteria database, wherein each message registration defines a set of one or more message objects that are to be considered in response to a future event when the future event meets a message criteria associated with the message registration;

detecting message events;

for each detected message event, querying the message criteria database to identify at least one message registration with a message criteria satisfied by the detected message event, resulting in a message registration query result;

for each detected message event, querying a relationship database, wherein the querying of the relationship database uses the message registration query result and a relationship database query result is usable to identify, using content from the relationship database including at least parent object and at least one child object, a chain of relationships from at least one message object or at least one message recipient in the message registration query result to a set of one or more message recipients comprising a message recipient set; and sending a message to each of the message recipients in the message recipient set following detection of the message events.

2. The method of claim 1, wherein the sent message is an e-mail message, a page, a voice-synthesized telephone message or a facsimile message.

3. The method of claim 1, wherein the contents of the sent message are a function of the message event and the chain of relationships.

4. The method of claim 1, further comprising a step of deciding whether or not to send a message based on an attribute of a message event where the message event is a change of state or location of a tracked asset.

5. The method of claim 4, wherein each tracked asset is associated with at least one of another asset, a person or entity.

6. The method of claim 4, further comprising a step of deciding whether or not to send a message based on an attribute of a message event where the message event is a change of an attribute of a tracked asset.

7. The method of claim 6, wherein the attribute is one of an asset location or an asset responsibility.

8. A method of tracking assets using a computer, comprising:

recording a plurality of message objects;

recording a plurality of message recipients;

accepting message registrations into a message criteria database, wherein each message registration defines a set of one or more message objects that are to be considered in response to a future event when the future event relating to one or more tracked assets meets a message criteria associated with the message registration;

detecting message events based on changes to a database of tracked assets;

for each detected message event, querying the message criteria database to identify at least one message registration with a message criteria satisfied by the detected message event, resulting in a message registration query result;

for each detected message event, querying a relationship database, wherein the querying of the relationship database uses the message registration query result and a relationship database query result is usable to identify a chain of relationships from at least one message object or at least one message recipient in the message registration query result to a set of one or more message recipients comprising a message recipient set; and sending a message to each of the message recipients in the message recipient set following detection of the message events.

9. A method for generating one or more messages in response to an event, the method comprising:

creating an instance in an event database based upon said event, said instance identifying an associated object;

accessing a relationship database, the content of which defines relationships between objects including said associated object;

traversing a chain of object relationships formed prior to the event by the relationship database starting with content in the relationship database corresponding to said associated object, each instance in said relationship database being associated with an object database that defines object type;

identifying one or more message recipients based upon message criteria defined prior to the event, said criteria being compared with information from said event database, relationship database and object database; and generating said one or more messages to said one or more message recipients.

10. The method of claim 9, wherein said relationship database defines relationship types between select child objects and parent objects, the chain being constructed from a series of child to parent relationships.

11. The method of claim 9, wherein said message criteria is disposed in a message criteria database.

12. The method of claim 9, wherein said message criteria database in combination with said relationship database enable messages to be selectively generated for one or more objects along said chain of object relationships.

13. A method in a messaging system of generating messages for delivery to recipients in response to events when specified conditions are met, comprising:

recording a plurality of message objects;

recording a plurality of message recipients;

accepting message registrations into a message criteria database, wherein each message registration defines a set of one or more message objects that are to be considered in response to a future event when the future event meets a message criteria associated with the message registration;

detecting message events;

for each detected message event, querying the message criteria database to identify at least one message registration with a message criteria satisfied by the detected message event, resulting in a message registration query result;

for each detected message event, generating a message recipient set from the message recipient query result and a chain of relationships, wherein the chain of relationships is a query result of querying a relationship database and includes at least one parent object and at least one child object; and sending a message to each of the message recipients in the message recipient set following detection of the message events.

14. A method of tracking assets using a computer, comprising:

recording a plurality of message objects;

recording a plurality of message recipients;

accepting message registrations into a message criteria database, wherein each message registration defines a set of one or more message entities objects that are to receive a message of be considered in response to a future event when the future event relating to one or more tracked assets meets a message criteria associated with the message registration;

detecting message events based on changes to a database of tracked assets;

for each detected message event, querying the message criteria database to identify at least one message registration with a message criteria satisfied by the detected message event, resulting in a message registration query result;

for each detected message event, generating a message recipient set from the message recipient query result and a chain of relationships, wherein the chain of relationships is a query result of querying a relationship database and includes at least one parent object and at least one child object; and sending a message to each of the message recipients in the message recipient set following detection of the message events.

* * * * *